United States Patent
Megyesi et al.

(10) Patent No.: US 10,525,978 B2
(45) Date of Patent: Jan. 7, 2020

(54) METHOD FOR CONTROLLING A PARKING MODE OF A VEHICLE

(71) Applicant: Dr. Ing. h.c. F. Porsche Aktiengesellschaft, Stuttgart (DE)

(72) Inventors: Peter Megyesi, Rutesheim (DE); Alfred Aden, Weissach (DE); Michael Bott, Korntal-Muenchingen (DE); Thomas Eggert, Pforzheim (DE); Christoph Braeuninger, Fellbach (DE); Oliver Baenfer, Renningen (DE); Marc Albrecht, Ludwigsburg (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 75 days.

(21) Appl. No.: 15/856,111

(22) Filed: Dec. 28, 2017

(65) Prior Publication Data

US 2018/0201265 A1    Jul. 19, 2018

(30) Foreign Application Priority Data

Jan. 17, 2017    (DE) .................. 10 2017 100 764

(51) Int. Cl.
　　*B60W 30/182*　　(2012.01)
　　*B60W 10/10*　　(2012.01)
　　*B60W 10/18*　　(2012.01)
　　*F16H 63/34*　　(2006.01)

(52) U.S. Cl.
　　CPC ......... *B60W 30/182* (2013.01); *B60W 10/10* (2013.01); *B60W 10/182* (2013.01); *B60W 2510/1005* (2013.01); *B60W 2520/04* (2013.01); *B60W 2540/04* (2013.01); *B60W 2710/10* (2013.01); *B60W 2710/186* (2013.01); *B60W 2710/188* (2013.01); *F16H 63/3416* (2013.01)

(58) Field of Classification Search
CPC ......... B60W 30/182; B60W 30/18109; B60W 10/10; B60W 10/182; B60W 2510/1005; B60W 2520/04; B60W 2540/04; B60W 2540/02; B60W 2540/16; B60W 2710/10; B60W 2710/186; B60W 2710/188; F16H 63/486; F16H 63/3416
See application file for complete search history.

(56) References Cited

U.S. PATENT DOCUMENTS

| | | | |
|---|---|---|---|
| 4,892,014 A | 1/1990 | Morell et al. | |
| 6,878,096 B1 | 4/2005 | Winner et al. | |
| 2015/0291134 A1* | 10/2015 | Kamo ....................... | B60T 7/12 701/70 |

FOREIGN PATENT DOCUMENTS

| | | | |
|---|---|---|---|
| DE | 19838885 A1 | 3/2000 | |
| DE | 102005005669 A1 | 8/2006 | |

* cited by examiner

*Primary Examiner* — Huan Le
(74) *Attorney, Agent, or Firm* — Leydig, Voit & Mayer, Ltd.

(57) ABSTRACT

A method for controlling a parking mode for a vehicle includes detecting an activation action of a user of the vehicle, determining a movement status of the vehicle, and activating a parking mode for the vehicle by closing a parking brake of a brake device of the vehicle and by engaging a gearshift lock of a transmission of the vehicle.

15 Claims, 5 Drawing Sheets

METHOD FOR CONTROLLING A PARKING MODE OF A VEHICLE

CROSS REFERENCE TO RELATED APPLICATIONS

This application claims benefit to German Patent Application No. DE 10 2017 100 764.4, filed Jan. 17, 2017, which is hereby incorporated by reference herein.

FIELD

The present invention relates to a method for controlling a parking mode of a vehicle and to a control device for carrying out such a method.

BACKGROUND

It is known that vehicles which are in the stationary state are to be secured against an intentional rolling away. Usually two securing mechanisms are known for this. This involves, on the one hand, what is referred to as a gearshift lock, which is also referred to as a parking lock and is employed in manually shiftable vehicles by engaging the first gear speed. In automatic transmissions there is the possibility for this of engaging what is referred to as the parking position P for the transmission with the selector lever. An additional or alternative securing possibility is to use a parking brake. This parking brake is usually also referred to as the handbrake.

In particular, in the case of automatic transmissions for vehicles there is the disadvantage that the difference between the gearshift lock or parking lock, on the one hand, and the parking brake, on the other, is not always clear for the user of the vehicle. Therefore, depending on the user a different frequency of use may occur if only the parking brake, only the gearshift brake or the parking brake and the gearshift lock together are employed. This leads, on the one hand, to a relatively complex operator control situation, since at least two actions have to be carried out separately or together. On the other hand, this complexity possibly gives rise to confusion or to a higher degree of expenditure for the actuation by the user.

SUMMARY

In an embodiment, the present invention provides a method for controlling a parking mode for a vehicle. The method includes detecting an activation action of a user of the vehicle, determining a movement status of the vehicle, and activating a parking mode for the vehicle by closing a parking brake of a brake device of the vehicle and by engaging a gearshift lock of a transmission of the vehicle.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
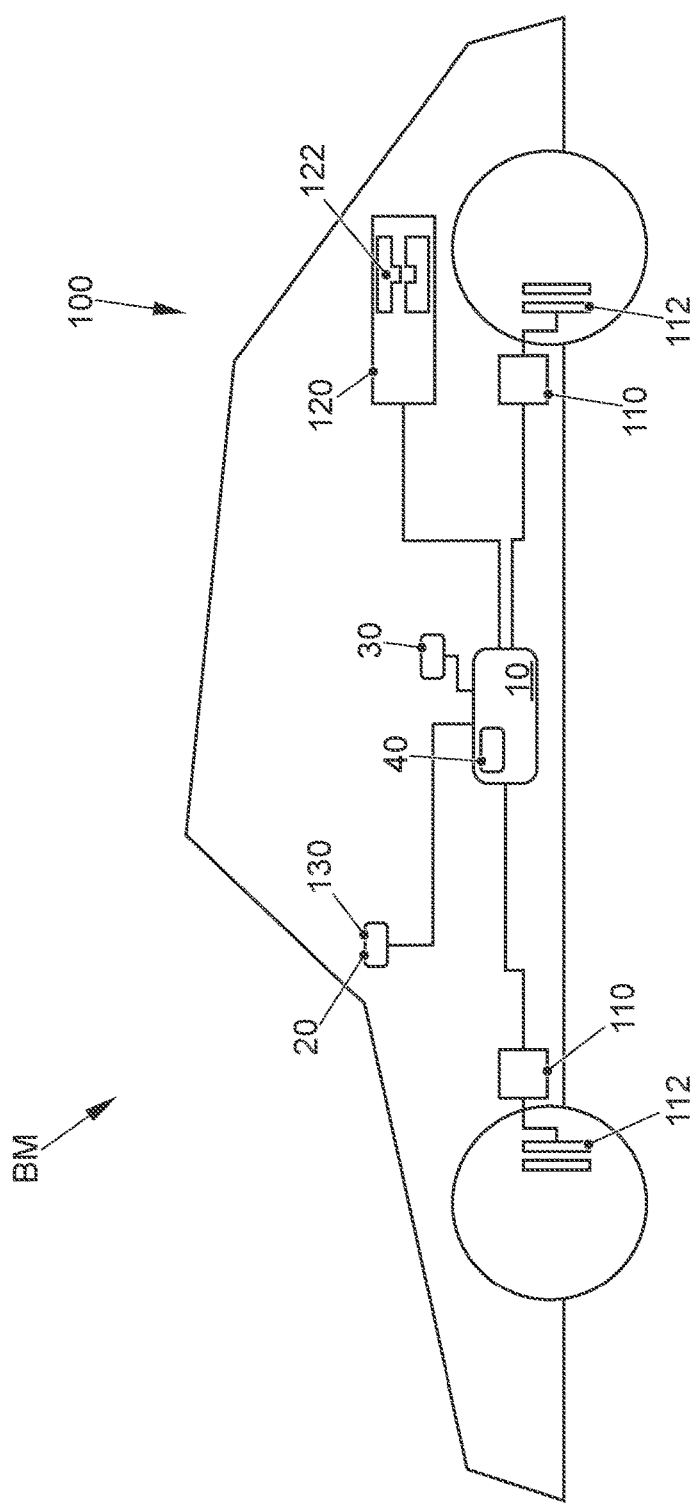
FIG. 1 shows a control device according to an embodiment of the invention.

Embodiments of the present invention can at least partially overcome the aforementioned disadvantages of the prior art. In particular, embodiments of the present invention provide a simple operator control for a parking mode for a vehicle in a cost-effective manner.

According to an embodiment of the invention, a method for controlling a parking mode for a vehicle is proposed which comprises the following steps: detecting an activation action of a user of the vehicle, determining the movement status of the vehicle, and activating the parking mode for the vehicle by closing a parking brake of a brake device of the vehicle and by engaging a gearshift lock of a transmission of the vehicle.

A method according to an embodiment of the invention therefore serves to secure a vehicle which is, in particular, in the stationary state against rolling away. This can also be understood as a parking securing means. In contrast to the previous solutions in which the customer has two operator control possibilities and would have to decide whether a gearshift lock (parking lock), a parking brake or even both are employed together, the complexity for the user is significantly reduced by a method according to an embodiment of the invention. Therefore, with, in particular, a single activation action it is possible to perform a detection operation which can make available a control of the parking mode by means of the method according to the invention. On the basis of this detected activation action, the movement status of the vehicle is then preferably checked and, in particular, compared with other corresponding predefined parameters. In particular, if the vehicle is in the stationary state, the parking mode can now be controlled or activated on the basis of this activation action.

According to embodiments of the present invention, two activation processes can be triggered using a single activation action. This involves, on the one hand, the activation and therefore the closing of the parking brake of a brake device and, on the other hand, the engagement of a gearshift lock of a transmission.

Embodiments of the invention can therefore, on the one hand, simplify the entire process for the user and, on the other hand, increase the safety for a parked vehicle. The use of a method according to an embodiment of the invention then ensures that a vehicle which is in the stationary state and which has been placed in a parking mode by the user is also actually in a defined situation, specifically in precisely this parking mode. This parking mode is assumed automatically if the activation action has been generated by the user and has been detected.

In a method according to an embodiment of the invention, the user of the vehicle can be, in particular, the driver of the vehicle. However, it is basically also conceivable that other occupants of the vehicle can execute the activation action as users. This is useful, in particular, if the emergency braking mode which will be explained later is to be employed. For a method according to an embodiment of the invention it is also basically irrelevant where the user is located when the parking mode is triggered or when the activation action is carried out. However, it can be preferred if the user is located within the passenger compartment of the vehicle and/or in a defined proximity around the vehicle, in order to carry out the activation action.

The activation action itself can be executed in very different ways and will be explained in more detail below. It is also conceivable that the activation action is composed of a multiplicity of individual action components, with the result that, for example, a combination of mechanical actuation of a pushbutton key can be combined with a corresponding utterance of an activation command. It is also conceivable that different activation actions can lead to the same result, and the user of the vehicle can, for example, therefore trigger a method according to an embodiment of the invention both by pressing a corresponding mechanical actuation pushbutton key and by uttering an activation command.

It can be advantageous if in a method according to an embodiment of the invention, when the parking mode is activated, the movement status is taken into account, in particular the parking mode is activated only if the vehicle is in the stationary state. The movement status of the vehicle can be determined, for example, by means of acceleration sensors or by sensing wheel rotational speeds. Information from the vehicle information system, about the current state of the engine or the mode of operation of the engine, can also be used to determine the movement status of the vehicle. As soon as the vehicle is in the stationary state, it can be assumed that at least one temporary securing process against the vehicle moving on is then desired. In particular, this situation is coupled to monitoring of the engine of the vehicle, with the result that not only the movement status but also the operating status of the vehicle is taken into account. It may be preferred that when a vehicle is shutdown, that is to say when it is stopped to the stationary state and the engine is simultaneously or subsequently switched off, a movement status is detected which basically explains the readiness to place the vehicle then in the parking mode. In other words, the movement status of the vehicle can, in particular, also be employed in interaction with further parameters of the vehicle, in order to limit the parking mode to defined employed regions if the vehicle is also actually to be secured in a parked state. This brings about a situation in which further improvement in respect of safety and a further reduction in respect of complexity can be achieved. The definition of the stationary state can be widened here, for example for movement of the vehicle below a defined threshold value. It is therefore possible, for example, for a gently rolling vehicle at a speed of, for example, less than approximately 3 km/h to approximately 5 km/h, also to be defined as a movement status in the stationary state, with the result that this gentle rolling on a slope can be dealt with by a parking mode and the corresponding activation in a method according to an embodiment of the invention.

It is a further advantage if in a method according to the invention the activation action of the user of the vehicle comprises at least one of the following actions: actuating, in particular pressing, of an activation element, execution of an activation gesture which can be detected with a sensor device, utterance of an activation command, and exiting of the user from the vehicle.

The present enumeration does not constitute a conclusive list. A particularly simple solution for the activation action is if a mechanical activation element is provided within the vehicle. Of course, this may also involve activation elements which are partially mechanical or activation elements which are configured purely as software, with the result that a corresponding soft key is displayed on a vehicle display. By activating such an activation element, the activation action can be triggered. It is also conceivable that such an activation element is embodied as a hard key and is located, for example, on the selector lever of a gear selector switch for the vehicle. An activation gesture is, in particular, a gesture which is carried out with a part of the user's body, for example their hands. An activation command is to be understood as, in particular, a voice control operation, and, for example, the utterance of a specific word therefore constitutes an activation command, thereby making the activation action detectable. Other actions by the driver or by the user of the vehicle, for example exiting the vehicle, can also constitute activation actions. Exiting can be detectable, for example, by means of the opening and closing of the door, by means of the occupancy of seats and by means of further parameters. Of course, other activation actions can also be employed individually or else in combination with the individual activation actions described above.

It is also advantageous if in a method according to an embodiment of the invention the parking mode is activated automatically when the vehicle comes to a standstill, by detecting a stopping action of the user. A stopping action is to be understood here as what is referred to as the hold function of a vehicle. In order to ensure that the vehicle starts and drives off or remains stationary in a comfortable way even on severe inclines, the parking mode can be activated automatically by means of a stopping action of the user. In other words, the parking mode is activated as long as the vehicle is in the stationary state. If the stopping action of the user is carried out when the vehicle is not yet in the stationary state, this can be understood as being what is referred to as a "standing to attention" position. As soon as the vehicle then goes into the stationary state, that is to say remains stationary, no additional stopping action or activation action has to take place anymore. Instead, the parking mode is then automatically activated by the vehicle simply being stationary, and the vehicle is therefore secured in the stationary position. In this way, this hold function can be triggered by the stopping action in order to make starting on an incline or staying stationary on an incline more comfortable for the user. Of course, it is also conceivable to switch off this functionality again by means of a stopping action or a reverse stopping action.

Furthermore, it can be advantageous if in a method according to an embodiment of the invention, before the activation of the parking mode, the location of the user relative to the vehicle is determined, in particular relative to the passenger compartment of the vehicle. It is therefore conceivable that an additional limitation for the method is also present here. It can therefore be useful if the parking mode can be activated only when the user is also located within the vehicle. This may be done, for example, by tracking the key of the vehicle or by corresponding monitoring of the seat occupancy and the door opening functionalities. Increased safety is ensured by virtue of the fact that a parking mode can be switched on only when the user who carries out the activation action is also located in the passenger compartment of the vehicle. However, the location can also be sensed with respect to a close area around the vehicle, in order to be able to ensure this safety function with increased comfort.

Furthermore, it can be advantageous if in a method according to an embodiment of the invention the closing of the parking brake and the engagement of the gearshift lock takes place in a predefined sequence and/or at a predefined time interval, in particular simultaneously or essentially simultaneously. The predefined sequence and/or the predefined time interval can relate here to the respective action. It is therefore conceivable, for example, that before the parking brake is switched on or closed the gearshift lock is firstly engaged in order to permit a certain degree of transmission play, with the result that corresponding mechanical elements can be oriented with respect to one another. However, a reverse sequence can also be favored here depending on the situation.

It is a further advantage if in a method according to an embodiment of the invention the parking mode is deactivated in reaction to detection of a release action of the user of the vehicle, wherein the release action comprises, in particular, at least one of the following actions: actuation, in particular pressing, of an activation element, execution of a release gesture which can be detected with a sensor device, utterance of a release command entry of the user into the vehicle, starting of the vehicle, and engagement of a driving position or of the neutral position of the transmission.

The above enumeration is not a completed list. In this context, the release action can be embodied identically as well as differently or similarly with respect to the activation action. In addition, it is conceivable that this release action is made available by starting the vehicle or correspondingly activating the transmission by engaging a driving position or the neutral position. In particular, the release action is independent of the activation action, with the result that here the method can be turned round in an even more simple and comfortable manner, in order to control the parking mode or deactivate it again.

Furthermore, it can be advantageous if in a method according to an embodiment of the invention, when a movement status of the vehicle above a predefined threshold value is determined, an emergency braking mode of the vehicle in which, in particular, the parking brake is closed is activated. It is therefore conceivable that as a result of the activation action when the vehicle is traveling this is understood to be an emergency braking operation of the user. However, it is useful to make available a different activation functionality at this time than is the case in a vehicle in the stationary state. It is therefore possible, for example, to close the parking brake slowly and in a quantitatively continuous fashion in the emergency braking mode in order to reduce the speed of the vehicle to such an extent that the gearshift lock can be engaged with little or no damage to the transmission. The emergency braking mode therefore expands a method according to an embodiment of the invention with an additional securing functionality when controlling the parking mode.

Furthermore, it is advantageous if in a method according to an embodiment of the invention, when a special action of the user of the vehicle is detected, at least one of the following actions is carried out: closing of an open parking brake when the gearshift lock is engaged, closing of an open parking brake when the transmission is in the driving position, closing of an open parking brake when the transmission is in the neutral position opening of a closed parking brake, and controlled hydraulic braking.

The above enumeration is not a conclusive list. In particular, the special action therefore treats atypical initial positions, for example when the vehicle is in a stationary state but the parking mode has not yet been activated. It is therefore conceivable that when the vehicle is stationary the user moves the gear selector lever into the parking position P. Therefore, although the gearshift lock is engaged, the parking brake is still open. This involves a possibility of an atypical initial position, in order nevertheless to be able to carry out a method according to an embodiment of the invention.

Embodiments of the present invention further provide a control device for controlling a parking mode for a vehicle. A control device according to an embodiment of the invention includes a detection unit for detecting an activation action of the user of the vehicle. In addition, a determining unit for determining the movement status of the vehicle and an activation unit for activating the parking mode for the vehicle are provided. The parking mode is activated by closing a parking brake of a brake device of the vehicle and by engaging a gearshift lock of the transmission of the vehicle. The detection unit has here in particular, a mechanically actuable switch. Therefore, control devices according to various embodiments of the invention have the same advantages as have been explained in detail with respect to the method according to embodiments of the invention. If the detection unit has a mechanical switch, this is preferably arranged in the region of the selector lever or directly on the selector lever of a selector switch of the transmission.

Figure 2:
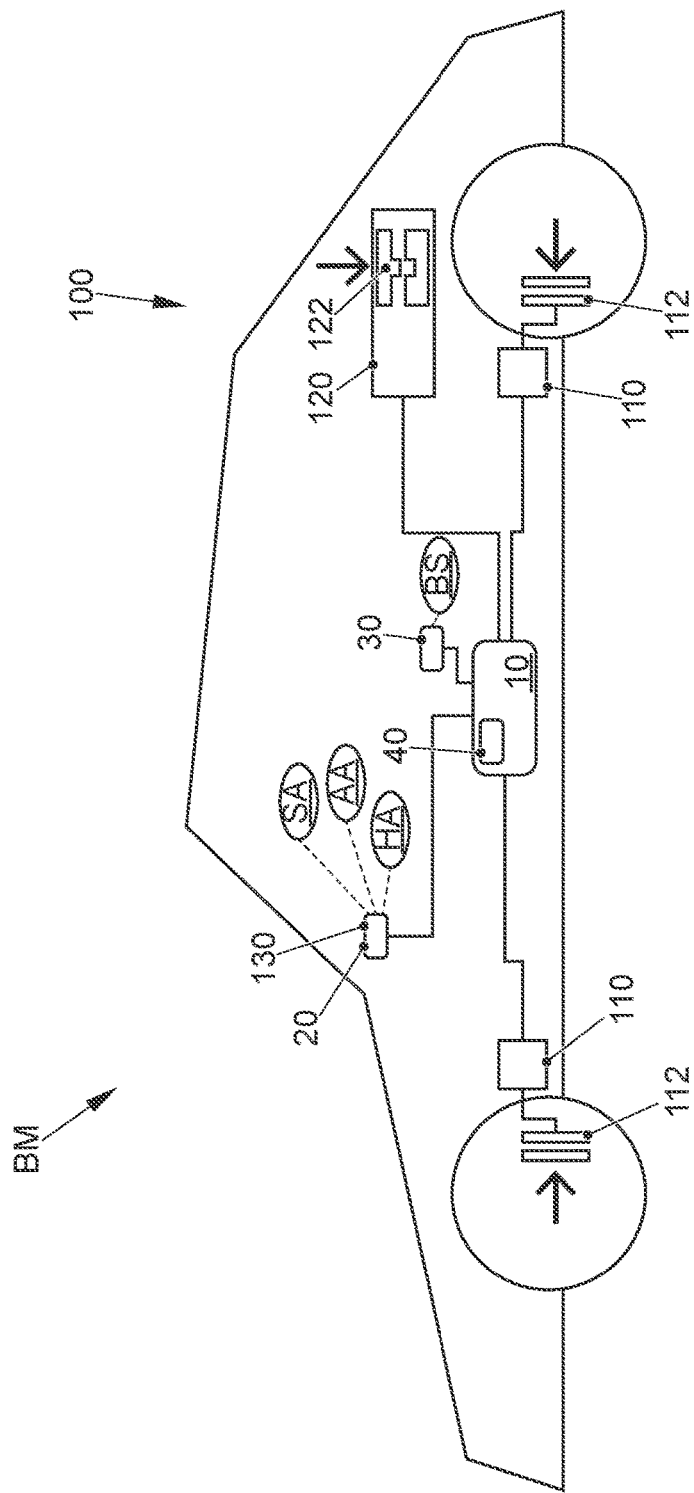
FIG. 2 shows the control device of FIG. 1 when different actions are detected.

FIGS. 1 to 5 describe possible passes for a method according to an embodiment of the invention with a control device 10 according to an embodiment of the invention. Thus, FIG. 1 shows a vehicle 100 which is in the operating mode BM. A control device 10 is arranged within the vehicle 100. This control device 10 is coupled in a signal-communicating fashion to a detection unit 20 which is provided with an activation element 130. FIG. 2 shows how various actions, for example the activation action AA, for example the stopping action HA and, for example, the release action LA or the special action SA can be received and detected by means of the activation element 130 or the detection unit 20. This information is passed on to the activation unit 40 in the control device 10. Furthermore, an association is made with information, detected by means of a determining unit 30, of the movement status BS of the vehicle 100.

Figure 3:
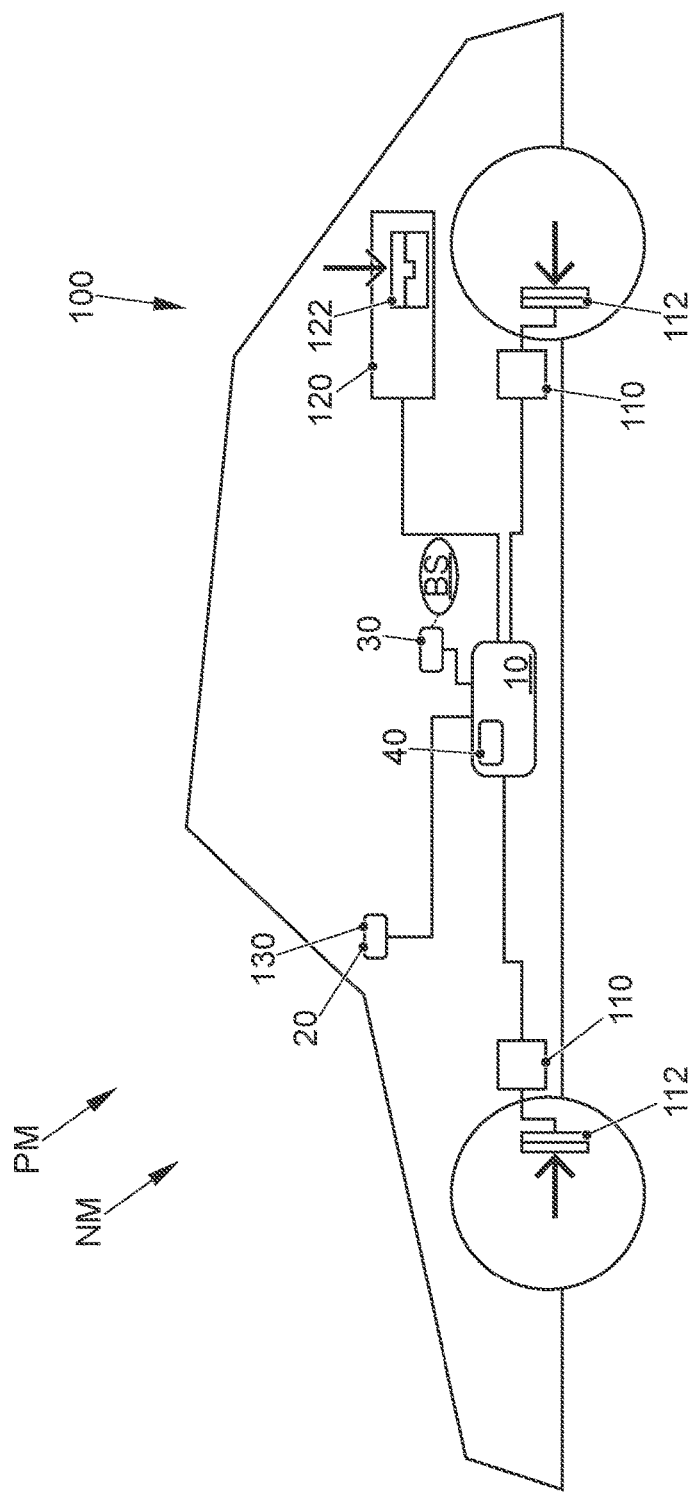
FIG. 3 shows the control device of FIG. 1 in a parking mode or in an emergency braking mode.

If the vehicle 100 is in the stationary state and if, for example, the activation action AA is detected by means of the detection unit 20, the stationary state movement status BS can also be passed on to the activation unit 40 via the determining unit 30. The parking mode PM is then actuated and activated, as illustrated in FIG. 3. This is done in that, according to FIG. 2, a closing command is transmitted via the activation unit 40 to the brake device 110 and there to the parking brake 112 of a respective axle. FIG. 3 shows how the parking brake 112 is closed and therefore its securing function is switched on. At the same time, and in a chronologically defined sequence or at a defined time interval, the transmission 120 is activated with a corresponding signaling process, with the result that a correspondingly associated gearshift lock 122 can also be engaged, as is shown by the comparison of FIGS. 2 and 3.

FIGS. 2 and 3 are also used in a similar way when an activation action AA is carried out as long as the vehicle 100 is still moving. However, a separate mode is then triggered, specifically what is referred to as the emergency braking mode NM which is also shown schematically in FIG. 3. However, other regulating mechanisms for actuating the brake device 110 and actuating the transmission 120 can be employed in a quantitative fashion here.

Figure 4:
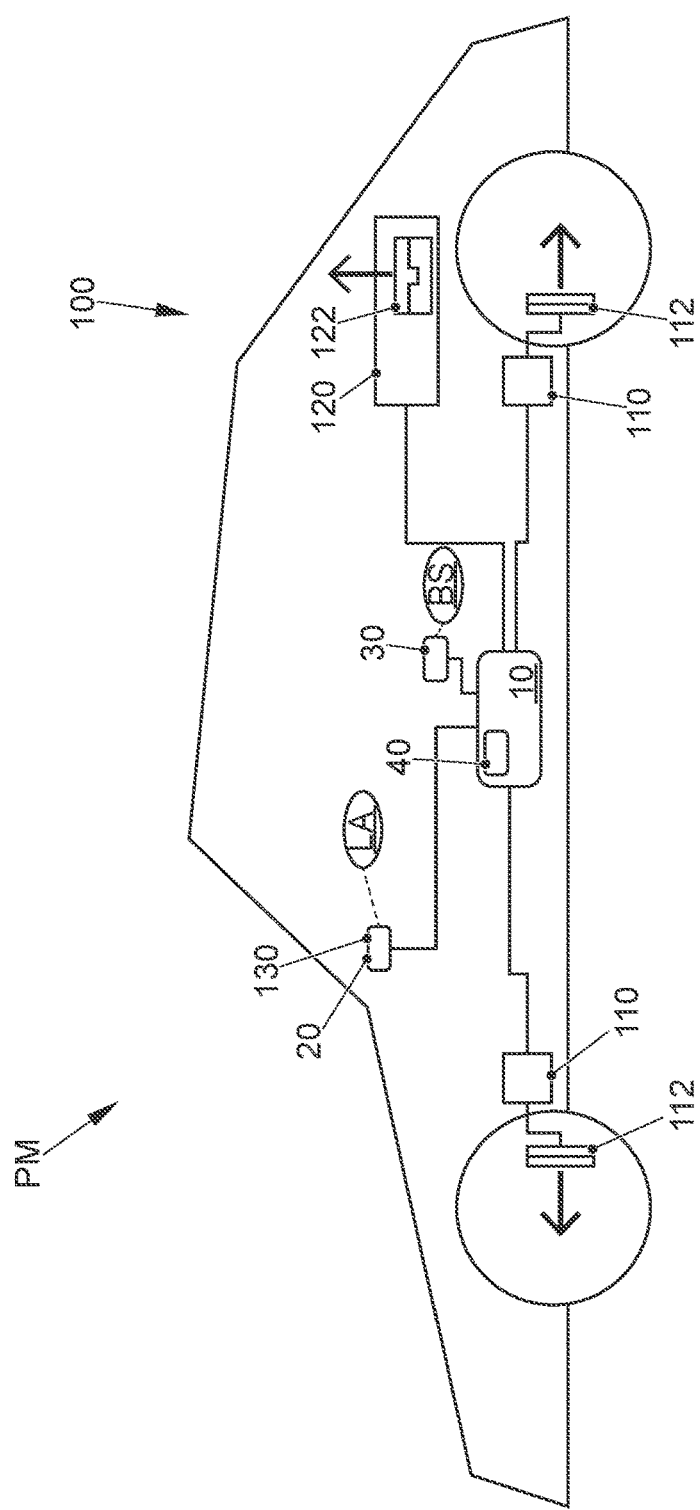
FIG. 4 shows the control device of FIG. 1 when a release action is detected.
Figure 5:
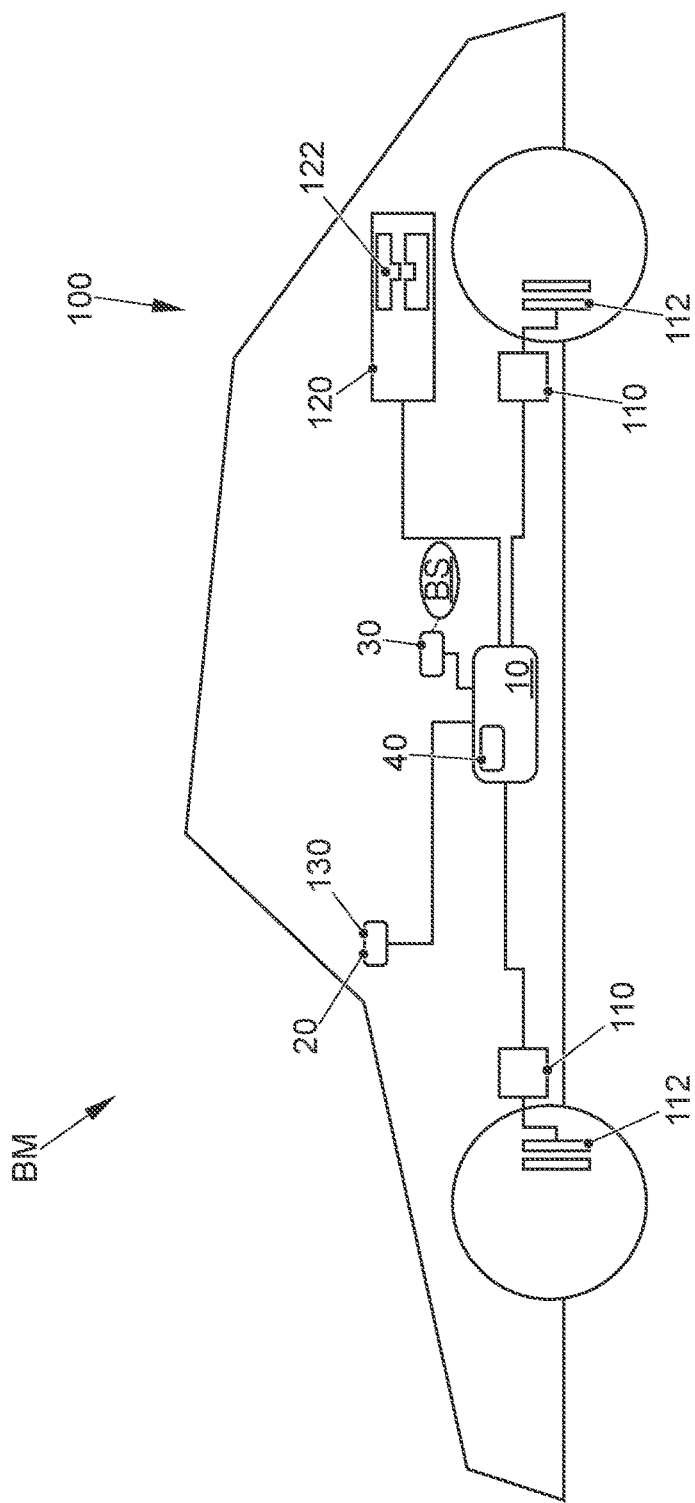
FIG. 5 shows the control device of FIG. 1 in an operating mode which has been reduced again.

FIG. 4 shows how the method steps can be reversed again using a release action LA, and therefore it is possible both to release the parking brake 112 and also to cancel the gearshift lock 122 again. This is carried out in essentially reverse sequence with an identical effect.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for controlling a parking mode for a vehicle, the method comprising:
   detecting a single activation action of a user of the vehicle;
   determining a movement status of the vehicle; and
   triggering, in response to the detecting the single activation action of the user, two separate parking mode activation processes, wherein the two separate parking mode activation processes include (i) closing a parking brake of a brake device of the vehicle and (ii) engaging a gearshift lock of a transmission of the vehicle, and
   carrying out the two separate parking mode activation processes so as to activate a parking mode.

2. The method as claimed in claim 1, wherein when the parking mode is activated, the movement status is taken into account.

3. The method as claimed in claim 2, wherein the parking mode is activated only if the vehicle is in a stationary state.

4. The method as claimed in claim 1, wherein the single activation action of the user of the vehicle comprises at least one of the following actions:
   actuating of an activation element,
   execution of an activation gesture which can be detected with a sensor,
   utterance of an activation command, or
   exiting of the user from the vehicle.

5. The method as claimed in claim 1, wherein the two separate parking mode activation processes are activated automatically when the vehicle comes to a standstill by detecting a stopping action of the user.

6. The method as claimed in claim 1, further comprising:
   before triggering the two separate parking mode activation processes, determining a location of the user relative to a passenger compartment of the vehicle.

7. The method as claimed in claim 1, wherein the two separate parking mode activation processes are carried out simultaneously.

8. The method as claimed in claim 1, further comprising deactivating the parking mode in response to detecting a release action of the user of the vehicle, wherein the release action comprises at least one of the following actions:
   actuation of an activation element,
   execution of a release gesture which can be detected with a sensor,
   utterance of a release command,
   entry of the user into the vehicle,
   starting of the vehicle, or
   engagement of a driving position or of a neutral position of the transmission.

9. The method as claimed in claim 1, wherein when the movement status of the vehicle is determined to be a moving state with a speed of movement above a predefined threshold value, an emergency braking mode of the vehicle is activated.

10. The method as claimed in claim 9, wherein carrying out the two separate parking mode activation processes so as to activate the parking mode when the emergency braking mode is activated comprises closing the parking brake of the vehicle in a quantitatively continuous fashion until the speed of movement falls below the predefined threshold value and subsequently engaging the gearshift lock of the transmission.

11. The method as claimed in claim 1, wherein when a special action of the user of the vehicle is detected, at least one of the following actions is carried out:
   closing of an open parking brake when the gearshift lock is engaged,
   closing of an open parking brake when the transmission is in a driving position,
   closing of an open parking brake when the transmission is in a neutral position, or
   opening of a closed parking brake.

12. The method as claimed in claim 1, wherein the parking brake of the brake device of the vehicle is located at a wheel of the vehicle.

13. The method as claimed in claim 1, wherein the single activation action of the user of the vehicle is composed of a multiplicity of individual action components, and
   wherein the multiplicity of individual action components include mechanical actuation of a pushbutton key and a corresponding utterance of an activation command.

14. The method as claimed in claim 1, wherein carrying out the two separate parking mode activation processes so as to activate the parking mode comprises engaging the gearshift lock of the transmission of the vehicle before closing the parking brake of the vehicle to permit a certain degree of transmission play thereby allowing corresponding mechanical elements to be oriented with respect to one another.

15. A control device, comprising:
   a first sensor configured to detect single activation action of a user of a vehicle,
   a second sensor configured to determine a movement status of the vehicle, and
   an activator configured to trigger, in response to the detecting the single activation action of the user, two separate parking mode activation processes, wherein the two separate parking mode activation processes include (i) closing a parking brake of a brake device of the vehicle and (ii) engaging a gearshift lock of a transmission of the vehicle.

* * * * *